United States Patent
Shoji et al.

(10) Patent No.: US 6,841,121 B2
(45) Date of Patent: Jan. 11, 2005

(54) PROCESS FOR PRODUCING OXIDE-DISPERSION STRENGTHENED PLATINUM MATERIAL

(75) Inventors: Toru Shoji, Kanagawa (JP); Soichi Hitomi, Kanagawa (JP); Yoshikazu Takagi, Kanagawa (JP); Yoshinobu Watanabe, Kanagawa (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 446 days.

(21) Appl. No.: 10/019,487

(22) PCT Filed: Jun. 15, 2001

(86) PCT No.: PCT/JP01/05127

§ 371 (c)(1),
(2), (4) Date: Dec. 31, 2001

(87) PCT Pub. No.: WO02/00951

PCT Pub. Date: Jan. 3, 2002

(65) Prior Publication Data

US 2002/0136660 A1 Sep. 26, 2002

(30) Foreign Application Priority Data

Jun. 28, 2000 (JP) ........................................ 2000-193990

(51) Int. Cl.[7] ................................................ B22F 3/24
(52) U.S. Cl. ............................. 419/19; 419/28; 419/30
(58) Field of Search ............................. 419/19, 28, 30, 419/29

(56) References Cited

U.S. PATENT DOCUMENTS 3,366,515 A * 1/1968 William et al. ............... 75/229
3,622,310 A * 11/1971 Reinacher et al. ........... 420/467
3,709,667 A * 1/1973 Seiman et al. ................ 75/234
4,002,503 A * 1/1977 Bourne et al. ............... 148/514
4,077,816 A * 3/1978 Nadkarni ...................... 419/19
4,252,558 A * 2/1981 Touboul et al. ............... 419/20
4,819,859 A * 4/1989 Schwenninger ............. 228/190
5,730,931 A * 3/1998 Poniatowski et al. ........ 420/466

FOREIGN PATENT DOCUMENTS

JP 2000-160268 A 6/2000

* cited by examiner

Primary Examiner—Daniel Jenkins
(74) Attorney, Agent, or Firm—Rothwell Figg Ernst & Manbeck

(57) ABSTRACT

This invention aims to provide a process for producing an oxide-dispersion strengthened platinum material which allows zirconium oxide to be more finely dispersed in a platinum material, and to further improve creep strength in an oxide-dispersion strengthened platinum material. This invention provides a process for producing an oxide-dispersion strengthened platinum material where zirconium oxide is finely dispersed in platinum, wherein powdered platinum is poured into water to prepare a platinum suspension; a zirconium nitrate solution and an urea solution are added in the platinum suspension for adjusting the suspension to a given pH to precipitate zirconium hydroxide and thus to form a zirconium hydroxide carrying platinum; the zirconium hydroxide carrying platinum is collected, which is then formed into a molding; the molding is sintered and forged under the conditions whereby secondary recrystallization growth in a platinum crystal proceeds, to form a platinum ingot; and the platinum ingot is cold-rolled in a processing rate of at least 70% and then the product is thermally recrystallized.

8 Claims, 2 Drawing Sheets

0.2mm 0.2mm 0.2mm

PROCESS FOR PRODUCING OXIDE-DISPERSION STRENGTHENED PLATINUM MATERIAL

TECHNICAL FIELD

This invention relates to a process for producing an oxide-dispersion strengthened platinum material by dispersing an oxide into platinum. In particular, it relates to a process for producing an oxide-dispersion strengthened platinum material in which zirconium oxide is finely dispersed in platinum.

BACKGROUND ART

A platinum material exhibiting good high-temperature strength has been used mainly as a structural material for glass melting. High-temperature strength required to the platinum material is so-called creep strength. In particular, it has been the most important objective in developing a platinum material to extend a duration until creep rupture as much as possible.

For improving creep strength in the strengthened platinum, there has been used a technique that a particular oxide is finely dispersed in platinum. A known example of such an oxide-dispersion strengthened platinum material is that in which zirconium oxide is dispersed. For producing a platinum material in which zirconium oxide is finely dispersed in platinum, there have been suggested a variety of processes such as powder metallurgy and internal oxidation.

The previous processes where zirconium oxide is dispersed in platinum can ensure a certain level of creep strength, i.e., a certain level of creep rupture life, but are insufficient to achieve further improvement in creep strength.

DISCLOSURE OF THE INVENTION

An objective of this invention is to further improve creep strength in an oxide-dispersion strengthened platinum material through allowing zirconium oxide to be more finely dispersed in a platinum material by providing a novel process for producing an oxide-dispersion strengthened platinum material.

We have intensely attempted to solve the above problems and have finally discovered the following process for producing an oxide-dispersion strengthened platinum. This invention provides a process for producing an oxide-dispersion strengthened platinum material where zirconium oxide is finely dispersed in platinum, comprising the steps of pouring powdered platinum into water to prepare a platinum suspension; adding a zirconium nitrate solution and an urea solution in the platinum suspension for adjusting the suspension to a given pH to precipitate zirconium hydroxide and thus to form a zirconium hydroxide carrying platinum; collecting the zirconium hydroxide carrying platinum, which is then formed into a molding; sintering and forging the molding under the conditions whereby secondary recrystallization growth in a platinum crystal proceeds, to form a platinum ingot; and cold-rolling the platinum ingot in a processing rate of at least 70% and then thermally recrystallizing the product.

According to a production process of this invention, zirconium oxide can be quite finely and homogeneously dispersed in a platinum base to improve creep strength of a resulting platinum material, i.e., extension of a creep rupture life. A platinum material prepared according to a production process of this invention is an oxide-dispersion strengthened platinum material where zirconium oxide is dispersed in platinum as those according to the prior art, but can exhibit improved creep strength compared with the prior art. It may be because a platinum material prepared according to a production process of this invention has a structure in which zirconium oxide is much more finely and homogeneously dispersed in comparison with that according to the prior art.

In producing a platinum material by conventional powder metallurgy, so-called coprecipitation is used to form a zirconium-oxide carrying platinum in which zirconium oxide is supported by platinum, or a platinum alloy in which zirconium has been added to platinum is melt-sprayed into water using, for example, a flame gun to form platinum powder which is then molded and sintered to provide a platinum material. In a process for producing an oxide-dispersion strengthened platinum material according to this invention, in contrast to that according to the prior art, platinum is processed into given powders in advance and the powdered platinum is subject to chemical precipitation to form a zirconium-hydroxide carrying platinum in which zirconium hydroxide is supported by platinum.

The zirconium-hydroxide carrying platinum is formed into a molding, which is then sintered, forged, cold-rolled and thermal recrystallized in sequence. This invention is characterized in that during sintering and forging, i.e., the steps before the last step of thermal recrystallization, sintering and forging are conducted under the conditions whereby secondary recrystallization of platinum proceeds. A production process according to this invention will be detailed one by one.

In contrast to conventional coprecipitation, in a production process of this invention, platinum is first processed into given powders; the powdered platinum is used to prepare a platinum suspension; a zirconium nitrate solution and an urea solution are added for adjusting the suspension to a given pH to precipitate zirconium hydroxide and thus to form zirconium-hydroxide carrying platinum; and the zirconium hydroxide is collected for forming a molding.

When a zirconium-hydroxide carrying platinum is formed by such a process, platinum alone is powdered in advance. Thus, platinum powders may be appropriately prepared as those having a particle size suitable for subsequent molding and sintering steps. In general, powdered platinum exhibits quite higher gas adsorption ability. However, according to a production process of this invention, gas adsorption on a platinum surface may be reduced due to the presence of zirconium hydroxide supported on the platinum surface so that unwanted pores due to adsorbed gas during molding and sintering, i.e., internal defects in the final platinum material, can be effectively prevented.

It is preferable in this invention to use heated powdery platinum when forming zirconium-hydroxide carrying platinum. The heating process is conduced at a temperature of 400° C. or higher. Such heating may considerably inhibit pore formation due to adsorbed gas during the subsequent molding and sintering processes. After the heating process, the surface of the powdered platinum becomes smooth so that zirconium hydroxide can be homogeneously and finely supported by each platinum surface and thus zirconium oxide can be quite homogeneously and finely dispersed in a platinum material. The heating process may be conducted during or after the powdering process.

In a production process according to this invention, an urea solution which is added to a platinum suspension together with a zirconium nitrate solution is preferable because it can facilitate controlling a chemical precipitation reaction. Urea is hydrolyzed into ammonia and carbon dioxide. Since the hydrolysis proceeds in a relatively slower rate, precipitating zirconium hydroxide may be quite homogeneously and finely supported on a platinum surface.

In a preferable procedure for adding an urea solution, a zirconium nitrate solution is added to the platinum suspension, the suspension is heated to boiling while being stirred, an urea solution is added to the suspension, the resulting suspension is further kept boiling for a certain period and then heating is stopped, or alternatively, a zirconium nitrate solution and an urea solution are added to a platinum suspension, the suspension is kept at 80° C. or higher while being stirred to adjust the suspension to a predetermined pH, the suspension is further kept at 80° C. or higher for a certain period and then heating is stopped. In both addition processes, the period when the system is kept is more preferably 30 min or more.

If the temperature of the suspension is too low when adding the urea solution, hydrolysis of urea is so slow that nucleus growth of zirconium hydroxide may preferentially proceed while nucleation little occurs. The suspension is, therefore, heated at a boiling temperature or at least 80° C. for promoting nucleation of zirconium hydroxide and maximizing a nucleus growth rate.

The urea solution is preferably adjusted to pH 4.5 to 11.0, more preferably pH 6.0 to 8.0 at the end of chemical precipitation. If it is less than pH 4.5, zirconium hydroxide is not formed, while if more than pH 11.0, carrying of zirconium hydroxide on a platinum surface may be interfered.

In a process for producing an oxide-dispersion strengthened platinum material according to this invention, a particle size of platinum used for preparing a platinum suspension, i.e., platinum powders prepared in advance, is preferably 0.05 to 10 $\mu$m. Platinum powders with a size of less than 0.05 $\mu$m cannot be readily prepared and may tend to form a bridge by aggregation. If the size is more than 10 $\mu$m, moldability may be reduced while zirconium hydroxide supported on each platinum powder surface may be poorly dispersed, leading to uneven secondary recrystallization growth during the final thermal recrystallization step. Thus, platinum powders with a particle size of 0.05 to 10 $\mu$m may be used to allow zirconium hydroxide to be extremely evenly dispersed and supported on individual platinum particle surfaces. Using such a zirconium-hydroxide carrying platinum, molding, sintering and forging may be conducted to finely disperse zirconium oxide in a platinum ingot. The zirconium oxide finely dispersed in a platinum ingot may suitably act as an inhibitor for controlling secondary recrystallization growth during the final thermal recrystallization step while improving creep strength of the platinum material.

The zirconium-hydroxide carrying platinum obtained by the above chemical precipitation is collected by, for example, filtration and is then subject to appropriate drying. In the production process of this invention, the collected zirconium-hydroxide carrying platinum is sequentially molded, sintered and forged. These steps are conducted under the conditions whereby secondary recrystallization growth of platinum proceeds, as described above.

Secondary recrystallization refers to recrystallization of a smaller number of coarse crystal grains, which is driven by a crystal grain boundary energy. In a process for producing an oxide-dispersion strengthened platinum material according to this invention, molding, sintering and forging of the zirconium-hydroxide carrying platinum is required for facilitating the secondary recrystallization.

A molding may be formed by commonly known powder metallurgy. For example, compression molding and sintering may be simultaneously conducted using, for example, mold casting and so-called HIP (hot isostatic pressing). Based on our study results, we, however, believe that in the production process of this invention, compression molding is preferably conducted by cold isostatic pressing. Zirconium-hydroxide carrying platinum powders may be compressed into a molding with a given shape by a uniaxial compression molding which is so-called a mold casting. However, cold isostatic pressing may be used to achieve a quite even platinum density distribution within a molding after compressing into a given shape so that an even and quite homogeneous platinum structure can be provided by the subsequent sintering step.

There are no specific restrictions to the conditions of the cold isostatic pressing, but it is preferable that zirconium-oxide carrying platinum is placed in a rubber mold, which is then molded at a molding pressure of 40 MPa or higher (about 408 kg/cm$^2$ or higher). If a molding pressure is less than 40 MPa, the material cannot be compressed into a molding with a given shape so that crystal growth by sintering cannot adequately proceed. There are no specific restrictions to an upper limit of a molding pressure, and it may be appropriately determined, depending on molding conditions such as a capacity of an apparatus used in molding and the shape of the molding.

After forming the molding, it is sintered and forged under the conditions whereby secondary recrystallization growth of platinum proceeds. By the sintering step, zirconium hydroxide in the molding is converted into zirconium oxide. In a production process of this invention, collected zirconium-hydroxide carrying platinum is formed into a molding and is then sintered while converting zirconium hydroxide into zirconium oxide. Alternatively, the collected zirconium-hydroxide carrying platinum may be sintered in advance to be converted into a zirconium-oxide carrying platinum, which it then used as a molding.

A temperature in the sintering step is preferably 1000 to 1400° C. Sintering at more than 1400° C. causes growth of coarse zirconium oxide grains so that zirconium oxide cannot be finely dispersed in a final platinum material, while at less than 1000° C., binding between platinum particles by sintering or crystal growth may be inadequate. There are no restrictions to an atmosphere during sintering.

It is preferable to conduct forging after heating to 1100 to 1400° C. The heating temperature range of 1100 to 1400° C. during forging is selected because at more than 1400° C., coarse zirconium oxide grains are grown so that zirconium oxide cannot be finely dispersed in a final platinum material, while at less than 1100° C., cracks tend to be generated during forging. For forging, a processing procedure is not limited striking with an air hammer is preferable because the material is heated to an elevated temperature.

After forming a platinum ingot by molding, sintering and forging as described above, the ingot undergoes thermal recrystallization by cold rolling under the condition of a processing rate of 70% or more, preferably 90% or more.

Because of the properties of the platinum material, if thermal recrystallization is conducted at less than 1200° C., recrystallization tends to inadequately proceed. Thus, it is preferably conducted at 1200° C. or higher, and an optimal temperature for thermal recrystallization may be appropriately determined, depending on a processing rate or the like during cold rolling.

BEST MODE FOR CARRYING OUT THE INVENTION

Figure 1:
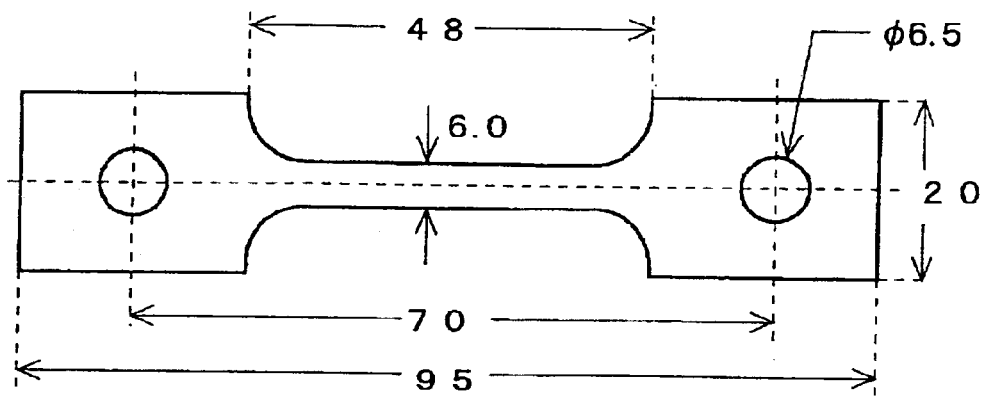
FIG. 1 is a schematic plan view of a test sample used in determining creep strength.

An embodiment of this invention will be described with reference to the following Examples and Conventional Examples.

EXAMPLE 1

Example 1 describes a case where Pt powders with a particle size of about 0.6 μm are used as Pt (platinum) powdered in advance; an urea solution is added to a mixture of a platinum suspension and a zirconium nitrate solution to form zirconium-hydroxide carrying platinum and thus to provide a platinum material. The powdered Pt used herein was prepared by ball-milling a suspension comprising powdered Pt with a specific surface area of about 23 $m^2/g$ and $CaCO_3$, heating the suspension at an elevated temperature of 1100° C., pouring the mass obtained after heating at an elevated temperature is poured into water and treated with nitric acid.

One kg of powdered platinum was poured into 1.5 kg of pure water to prepare a platinum suspension. To the platinum suspension was added a solution of $Zr(NO_3)_4$ (4.56 g, concentration: 96.66%) to prepare a mixed solution. The mixed solution was heated at a boiling temperature.

After boiling, to the mixed solution was added a solution of urea (4.0 g) in water to adjust the solution to pH 7.0. After pH adjusting, the mixed solution was kept boiling for about 30 min and then heating was stopped. This process caused conversion of $Zr(NO_3)_4$ in the mixed solution into $Zr(OH)_4$, which was precipitated. The $Zr(OH)_4$ precipitated was carried by Pt grains in the mixed solution.

The mixed solution containing the precipitate was filtered to collect zirconium-hydroxide carrying platinum. The collected zirconium-hydroxide carrying platinum was, after washing, dried at 120° C. in an ambient atmosphere.

The zirconium-hydroxide carrying platinum obtained by the drying process was passed through a 300 μm sieve. After passing through the 300 μm sieve, the zirconium-hydroxide carrying platinum was placed in a rubber mold, which was subject to cold isostatic pressing (CIP) under a hydrostatic pressure of 98.1 MPa (1000 $kg/cm^2$) to provide a molding with a given shape.

Then, the molding thus obtained was sintered at 1200° C. for 1 hour in an ambient atmosphere. While heating at 1200° C., the sintered molding was forged with an air hammer to form a platinum ingot.

The platinum ingot was subject to cold rolling in a processing rate of 90%. Then, the ingot was subject to thermal recrystallization at 1400° C. for 1 hour to form a platinum material with a given shape. Analysis of the platinum material in this Example 1 indicated that $ZrO_2$ was dispersed in the platinum material in about 0.12%.

EXAMPLE 2

Example 2 shows a case where the same Pt powders as those in Example 1 are used, a zirconium nitrate solution and an urea solution are simultaneously added to a platinum suspension to form a zirconium-hydroxide carrying platinum and thus to prepare a platinum material.

One kg of powdered platinum was poured into 1.5 kg of pure water to prepare a platinum suspension. To the platinum suspension was added a mixture of a solution of $Zr(NO_3)_4$ (4.56 g, concentration: 96.66%) and an aqueous solution of urea (urea; 4.0 g). The mixture was heated to 90° C. and kept the mixture at the temperature. After confirming that pH became 7.0 by hydrolysis of urea during kept at 90° C., the mixture was further kept at 90° C. for about 30 min and then heating was stopped.

This process caused conversion of $Zr(NO_3)_4$ in the mixed solution into $Zr(OH)_4$, which was precipitated. The $Zr(OH)_4$ precipitated was carried by Pt grains in the mixed solution.

The mixed solution was filtered to collect zirconium-hydroxide carrying platinum. The collected zirconium-hydroxide carrying platinum was, after washing, dried at 120° C. in an ambient atmosphere. The dried zirconium-hydroxide carrying platinum was molded, sintered and forged.

Since the production conditions after forming the zirconium-hydroxide carrying platinum were the same as those in Example 1, details will be omitted. Analysis of the platinum material in this Example 2 indicated that $ZrO_2$ was dispersed in the platinum material in about 0.12%.

CONVENTIONAL EXAMPLE 1

This Conventional Example 1 describes a case where zirconium is added to platinum to form a platinum alloy, which is then melt-sprayed by means of, for example a flame gun into water to form platinum powders, i.e., preparation of a platinum material by forming platinum powders using so-called flame spraying.

In a producing process of this Conventional Example 1, at first, a platinum ingot containing a given amount of zirconium was formed by vacuum melting and forged. The platinum ingot was subject to trench rolling for wire drawing.

The wire-drawn mass was melt-sprayed into a distilled water bath using a flame gun to form platinum-alloy powders. The platinum-alloy powders thus formed were oxidized at 1250° C. for 24 hours in an ambient atmosphere. The oxidized platinum-alloy powders were compacted into a given shape by means of mold casting and then sintered at 1250° C. for 1 hour. The molding thus formed was shaped by means of an air hammer, cold-rolled in a processing rate of 90% and was subject to thermal recrystallization at 1400°

C. for 1 hour to provide a platinum material of this example. In the platinum material, $ZrO_2$ was dispersed at about 0.16%.

CONVENTIONAL EXAMPLE 2

This Conventional Example 2 shows a case where platinum powders are formed by carrying zirconium oxide on platinum by co-precipitation and the platinum powders are used to prepare a platinum material.

In this Conventional Example 2, a hexachloroplatinic acid solution and a zirconium nitrate solution were mixed. To the resulting solution were added hydrazine hydrate as a reducing agent and calcium hydroxide for adjusting pH to cause coprecipitation and thus to provide $Pt-Zr(OH)_4$. Then, the product was filtered, dried and sintered to form zirconium-oxide carrying platinum powders.

A graphite crucible was charged with the platinum powders prepared by the coprecipitation technique. After vibrating the crucible by tapping for 1 to 2 min, it was heated to 800° C. over about 6 hours under an argon atmosphere as the first sintering step. Then, the crucible was kept at 800° C. for 2 hours. At the end of the first sintering step, the sintered compact was turned 180 degrees, and then was subject to the second sintering on a ceramic holder. During the second sintering, the crucible was heated to 1600° C. over about 4 hours and kept at the temperature for 3 hours.

At the end of the second sintering, the sintered compact was forged under an argon atmosphere to be processed such that a density of the sintered compact became about 90% of the theoretical density. The forged product was annealed at 1000° C. for 20 min under an ambient atmosphere and cold-rolled to provide a platinum material of this example. In the platinum material obtained in this Conventional Example 2, $ZrO_2$ was dispersed in about 0.16%.

The platinum materials as referred to in Examples 1 and 2 and Conventional Example 1 and 2 were determined for their high-temperature creep property, whose results will be described. Table 1 shows the results of determination of creep strength for individual platinum materials. Creep strength test was conducted through preparing a test sample shown in FIG. 1 (thickness: 1.0 mm, values in FIG. 1 are in mm) and determining a creep rupture time when test samples were left in an atmosphere at 1400° C. while varying a load applied to the sample.

TABLE 1

| Test sample | Load (MPa) | Creep rupture time (hr) |
| --- | --- | --- |
| Example 1 | 14.5 | 104 |
| | 14.5 | 146 |
| | 14.5 | 186 or more |
| | 14.5 | 209 or more |
| | 14.5 | 221 or more |
| Example 2 | 14.5 | 124 |
| | 14.5 | 150 |
| | 14.5 | 193 or more |
| | 14.5 | 204 or more |
| | 14.5 | 211 or more |
| Conventional Example 1 | 14.5 | 7 |
| | 14.5 | 11 |
| | 14.5 | 20 |
| Conventional Example 2 | 14.5 | 10 |
| | 14.5 | 14 |
| | 14.5 | 20 |

TABLE 1-continued

| Test sample | Load (MPa) | Creep rupture time (hr) |
| --- | --- | --- |
| | 15.0 | 20 |
| | 15.0 | 43 |
| | 15.0 | 58 |
| | 17.0 | 43 |
| | 20.0 | 9 |

As described in Table 1, creep rupture times determined under a load of 14.5 MPa were given in Examples 1 and 2. In these results, for example, "186 or more" means that rupture did not occur after 186 hours.

As seen by comparing the results from Conventional Examples 1 and 2 with those from Examples 1 and 2, the platinum materials in Examples 1 and 2 have obviously improved creep strength. In the cases where a load is 14.5 MPa, it was found that a creep rupture life in Examples 1 and 2 was about four times as long as that in Conventional Examples 1 and 2.

Figure 2:
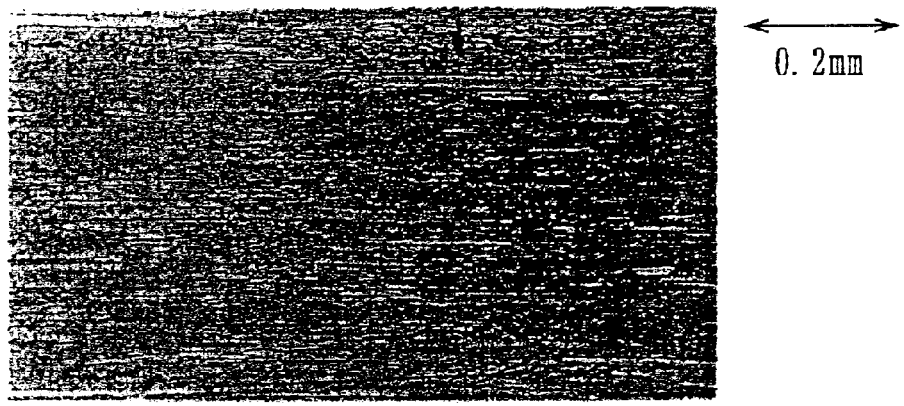
FIG. 2 is a photograph showing a cross-sectional metal structure in the platinum material in Conventional Example 1.
Figure 3:
FIG. 3 is a photograph showing a cross-sectional metal structure in the platinum material in Conventional Example 2.
Figure 4:
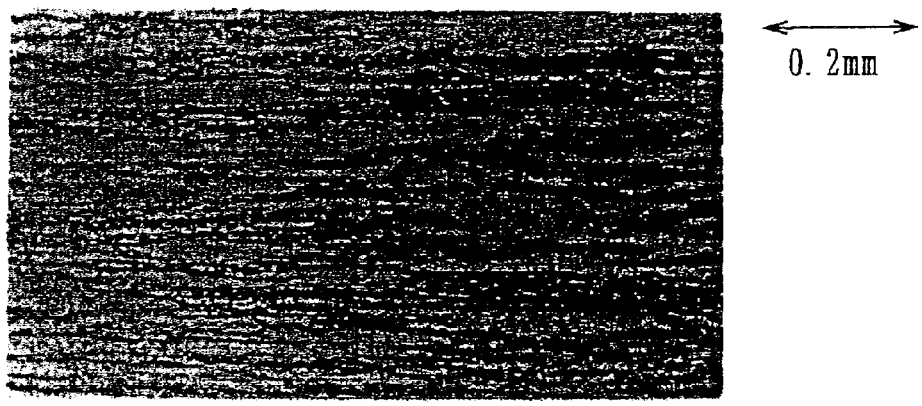
FIG. 4 is a photograph showing a cross-sectional metal structure in the platinum material in Example 1.

The results of observation of a metal structure for the platinum material prepared in Example 1 will be described. FIGS. 2, 3 and 4 show metallographic microscopy results for cross-sectional structures after thermal recrystallization at 1400° C. for 1 hour for the platinum materials in Conventional Example 1, Conventional Example 2 and Example 1, respectively (magnification: 100).

As seen in FIGS. 2 to 4, it was observed that there are no significant differences for platinum crystal size, distribution and so on between the metal structures of Conventional Examples 1 and 2 and Example 1. Since the distribution of zirconium oxide could not be directly investigated in this metal structure observation, only platinum in each platinum material was dissolved to observe the distribution of zirconium oxide by SEM. As a result, it was obvious that zirconium oxide was more finely and more homogeneously dispersed in Example 1 than in Conventional Example 1 or 2. Therefore, although the platinum material of Example 1 was similar to that according to the prior art in terms of metallographic properties such as the size and distribution of platinum crystal grains, it may be pressured that zirconium oxide is more finely and more homogeneously dispersed in platinum than those in Conventional Example 1 or 2, resulting in improved creep strength.

INDUSTRIAL APPLICABILITY

According to this invention, zirconium oxide can be more finely and more homogeneously dispersed in platinum to further improve creep strength in an oxide-dispersion strengthened platinum material, which allows producing a material highly suitable as a structural material for glass melting.

What is claimed is:

1. A process for producing an oxide-dispersion strengthened platinum material where zirconium oxide is finely dispersed in platinum, wherein powdered platinum is poured into water to prepare A platinum suspension;

a zirconium nitrate solution and an urea solution are added in the platinum suspension for adjusting the suspension to a given pH to precipitate zirconium hydroxide and thus to form a zirconium hydroxide carrying platinum;

the zirconium hydroxide carrying platinum is collected, which is then formed into a molding;

the molding is sintered and forged under the conditions whereby secondary recrystallization growth in a platinum crystal proceeds, to form a platinum ingot; and the platinum ingot is cold-rolled in a processing rate of at least 70% and then the product is thermally recrystallized.

2. The process for producing an oxide-dispersion strengthened platinum material according to claim 1 wherein the powdered platinum is thermally treated in advance.

3. The process for producing an oxide-dispersion strengthened platinum according to claim 1 wherein a zirconium nitrate solution is added to the platinum suspension; the suspension is heated to boiling while being stirred; an urea solution is added to the suspension is further kept boiling for a certain period; and then heating stopped.

4. The process for producing an oxide-dispersion strengthened platinum material according to claim 1 wherein a ziroconium nitrate solution and an urea solution are added to a platinum suspension; the suspension is kept 80° C. or higher while being stirred to adjust the suspension to a predetermined pH; the suspension is further kept 80° C. or higher for a certain period; and then heating is stopped.

5. The process for producing an oxide-dispersion strengthened platinum material according to claim 1, wherein pH is adjusted to 4.5 to 11.0.

6. The process for producing an oxide-dispersion strengthened platinum material according to claim 1 wherein the platinum used for preparing the platinum suspension are powders with particle size of 0.05 to 10 $\mu$m.

7. The process for producing an oxide-dispersion strengthened platinum material according to claim 1 wherein sintering is conducted at 1000 to 1400° C.

8. The process for producing an oxide-dispersion strengthened platinum material according to claim 1 wherein forging is conducted after heating at 1100 to 1400° C.

* * * * *